United States Patent
Park et al.

(10) Patent No.: US 9,199,528 B2
(45) Date of Patent: Dec. 1, 2015

(54) HYBRID POWER TRAIN FOR VEHICLES

(71) Applicant: Hyundai Motor Company, Seoul (KR)

(72) Inventors: Jong Yun Park, Whasung-Si (KR); Jae Young Choi, Whasung-Si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/283,841

(22) Filed: May 21, 2014

(65) Prior Publication Data

US 2015/0148168 A1 May 28, 2015

(30) Foreign Application Priority Data

Nov. 25, 2013 (KR) .................. 10-2013-0143986

(51) Int. Cl.
| | |
|---|---|
| *F16H 3/72* | (2006.01) |
| *F16H 37/06* | (2006.01) |
| *B60K 6/36* | (2007.10) |
| *B60K 6/365* | (2007.10) |
| *B60K 6/442* | (2007.10) |
| *B60K 6/38* | (2007.10) |

(52) U.S. Cl.
CPC . *B60K 6/36* (2013.01); *B60K 6/365* (2013.01); *B60K 6/442* (2013.01); *B60K 2006/381* (2013.01); *F16H 2200/0021* (2013.01); *Y10S 903/902* (2013.01)

(58) Field of Classification Search
CPC .............................................. F16H 2200/0021
See application file for complete search history.

(56) References Cited

U.S. PATENT DOCUMENTS

| | | | | |
|---|---|---|---|---|
| 6,634,986 | B2* | 10/2003 | Kima ........................... | 477/107 |
| 2009/0298634 | A1 | 12/2009 | Ren et al. | |
| 2010/0261565 | A1* | 10/2010 | Ai et al. ......................... | 475/5 |
| 2011/0300983 | A1* | 12/2011 | Kurokawa ..................... | 475/5 |
| 2012/0004063 | A1* | 1/2012 | Koyama et al. ............... | 475/5 |
| 2013/0090202 | A1* | 4/2013 | Hiraiwa ......................... | 475/5 |
| 2013/0260936 | A1* | 10/2013 | Takei et al. .................... | 475/5 |

FOREIGN PATENT DOCUMENTS

| | | |
|---|---|---|
| JP | 10-291421 A | 11/1998 |
| JP | 2004-161053 A | 6/2004 |
| JP | 2010-216605 A | 9/2010 |
| JP | 2012-35661 A | 2/2012 |
| JP | 2013-154682 A | 8/2013 |
| KR | 10-2012-0019855 A | 3/2012 |

* cited by examiner

*Primary Examiner* — Tisha Lewis

(74) *Attorney, Agent, or Firm* — Morgan, Lewis & Bockius LLP

(57) ABSTRACT

A hybrid power train for vehicles, including a drive shaft rotated by engine power, an engine-side drive gear concentrically installed on the drive shaft so as to be rotated by drive shaft power, first and second power transmission control units configured to form different power transmission paths for transmitting power from the drive shaft to the engine-side drive gear, and to control respective power transmission states, an output shaft arranged in parallel to the drive shaft, an engine-side driven gear rotatably provided on the output shaft so as to mesh with the engine-side drive gear, a clutch unit for switching the operating state of the engine-side driven gear between a fixed state and a released state relative to the output shaft, a motor-side drive gear rotated by motor power, and a motor-side driven gear fixedly provided on the output shaft so as to mesh with the motor-side drive gear.

7 Claims, 7 Drawing Sheets

HYBRID POWER TRAIN FOR VEHICLES

CROSS REFERENCE TO RELATED APPLICATION

The present application claims priority of Korean Patent Application Number 10-2013-0143986 filed on Nov. 25, 2013, the entire contents of which is incorporated herein for all purposes by this reference.

BACKGROUND OF THE INVENTION

1. Field of the Invention

The present invention relates, in general, to hybrid power trains for vehicles and, more particularly, to a hybrid power train for vehicles which can transmit power from at least one of an internal combustion engine and an electric motor to a mechanism being driven.

2. Description of Related Art

Generally, a hybrid power train for vehicles is a shaft and gear set that is designed to drive a vehicle by optimally, harmoniously and efficiently utilizing power output from an internal combustion engine and power output from an electric motor. To increase driving efficiencies of vehicles, the hybrid power train is configured to efficiently utilize the complementary qualities of the engine torque characteristics and the motor torque characteristics.

A conventional hybrid power train is designed such that, when a vehicle is started or is being driven at low speeds, the hybrid power train enters an EV (electric vehicle) mode, in which the vehicle is being driven by a motor that has good torque characteristics at low speeds, and when the vehicle is being driven at moderate or high speeds, the hybrid power train enters an engine mode, in which the vehicle is driven by an engine that has relatively higher torque characteristics compared to the motor mode, and when the vehicle is required to be driven by substantially high torque, the hybrid power train enters a hybrid mode, in which the vehicle is driven by both the engine torque and the motor torque.

Further, the hybrid power train for vehicles is required to have a variety of driving modes and to realize a plurality of gear stages in each driving mode using a simple construction by optimally utilizing the engine torque characteristics and the motor torque characteristics.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hybrid power train for vehicles, which has a variety of driving modes and can realize a plurality of gear stages in each driving mode using a simple construction by optimally utilizing engine torque characteristics and motor torque characteristics, thereby increasing driving efficiencies of vehicles and increasing the mileage of vehicles.

In an aspect of the present invention, a hybrid power train for vehicles may include a drive shaft installed to be rotated by power of an engine, an engine-side drive gear concentrically installed on the drive shaft so as to be concentrically rotated by power of the drive shaft, a first power transmission control unit and a second power transmission control unit configured such that the first and second power transmission control units form different power transmission paths for transmitting the power from the drive shaft to the engine-side drive gear, and control respective power transmission states, an output shaft arranged in parallel to the drive shaft, an engine-side driven gear rotatably provided on the output shaft and meshed with the engine-side drive gear, a clutch unit provided switching an operating state of the engine-side driven gear between a fixed state and a released state relative to the output shaft, a motor-side drive gear rotated by power of a motor, and a motor-side driven gear fixedly provided on the output shaft and meshed with the motor-side drive gear.

The first power transmission control unit may include an engine clutch installed between the drive shaft and the engine-side drive gear, and the second power transmission control unit may include a planetary gear mechanism installed between the drive shaft and the engine-side drive gear at a location separated from the engine clutch.

The engine clutch is mounted inside the engine-side drive gear.

The planetary gear mechanism may include a carrier directly connected to the drive shaft, a ring gear directly connected to the engine-side drive gear, a sun gear rotatably installed on the drive shaft such that a rotation of the sun gear is controlled, and a brake installed to be selectively engaged with the sun gear to control the rotation of the sun gear.

A generator is connected to the ring gear of the planetary gear mechanism so as to generate electricity using input power.

The clutch unit may include a dog clutch configured to switch the operating state of the engine-side driven gear between the fixed state and the released state relative to the output shaft.

The clutch unit may include a synchro-meshing device configured to switch the operating state of the engine-side driven gear between the fixed state and the released state relative to the output shaft.

The engine-side drive gear may have a diameter larger than a diameter of the engine-side driven gear, and the motor-side drive gear may have a diameter smaller than a diameter of the motor-side driven gear.

As described above, the present invention provides a hybrid power train for vehicles, which has a variety of driving modes and can realize a plurality of gear stages in each driving mode using a simple construction by optimally utilizing engine torque characteristics and motor torque characteristics, so the present invention can increase the driving efficiency of vehicles and can increase the mileage of vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
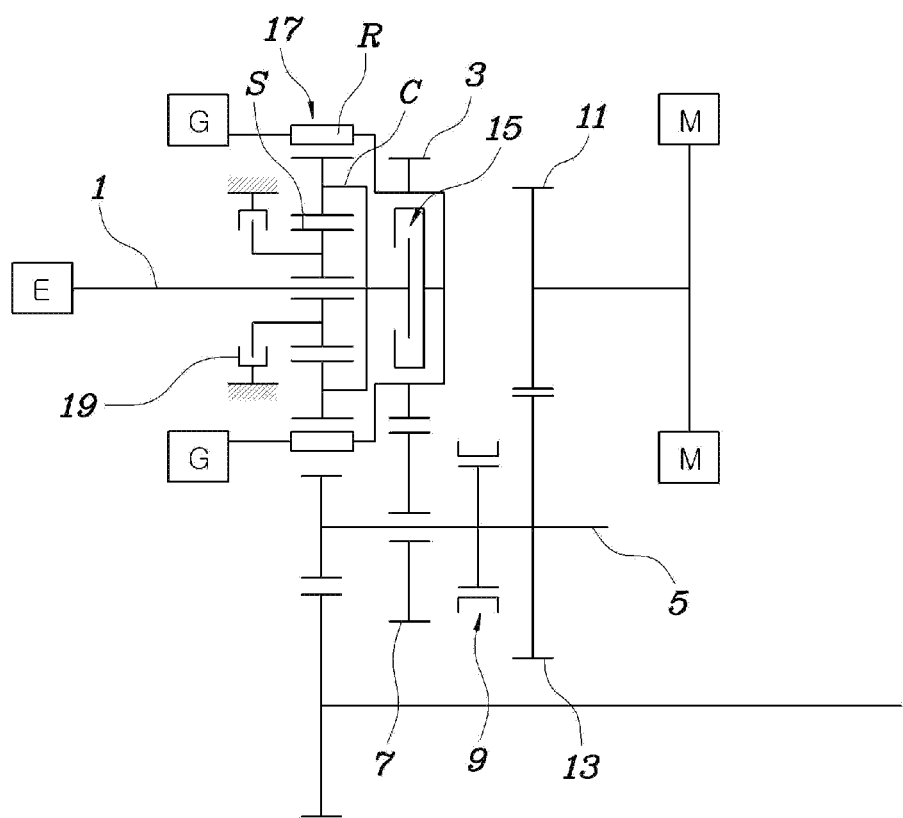
FIG. 1 is a view schematically illustrating the construction of a hybrid power train for vehicles according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, preferred embodiments of the present invention will be described in detail with reference to the accompanying drawings.

With reference to FIG. 1, a hybrid power train for vehicles according to an exemplary embodiment of the present invention includes: a drive shaft 1 installed to be rotated by power of an engine E, an engine-side drive gear 3 concentrically installed on the drive shaft 1 so as to be concentrically rotated by power of the drive shaft 1, a first power transmission control unit and a second power transmission control unit configured such that the first and second power transmission control units can form different power transmission paths for transmitting power from the drive shaft 1 to the engine-side drive gear 3, and can control respective power transmission states, an output shaft 5 arranged in parallel to the drive shaft 1, an engine-side driven gear 7 rotatably provided on the output shaft 5 so as to mesh with the engine-side drive gear 3, a clutch unit 9 provided so as to switch the operating state of the engine-side driven gear 7 between a fixed state and a released state relative to the output shaft 5, a motor-side drive gear 11 rotated by power of a motor M, and a motor-side driven gear 13 fixedly provided on the output shaft so as to mesh with the motor-side drive gear 11.

In other words, the hybrid power train of the present invention is configured such that power of the engine is output by the drive shaft 1, and rotates both the engine-side drive gear 3 and the engine-side driven gear 7 under the control of the first and second power transmission control units, so the power of the engine can be transmitted to the output shaft 5, and power of the motor can be transmitted to the output shaft 5 by the meshing of the motor-side driven gear 13 with the motor-side drive gear 11.

In the present embodiment, the first power transmission control unit includes an engine clutch 15 that is installed between the drive shaft 1 and the engine-side drive gear 3, and the second power transmission control unit includes a planetary gear mechanism 17 that is installed between the drive shaft 1 and the engine-side drive gear 3 at a location separated from the engine clutch 15.

In an exemplary embodiment of the present invention, the engine clutch 15 is mounted inside the engine-side drive gear 3.

The planetary gear mechanism 17 includes: a carrier C that is directly connected to the drive shaft 1, a ring gear R that is directly connected to the engine-side drive gear 3, a sun gear S that is rotatably installed on the drive shaft 1 in such a way that a rotation of the sun gear S can be controlled, and a brake 19 that is installed to control the rotation of the sun gear S.

Accordingly, when the brake 19 is maintained in a released state, the planetary gear mechanism 17 cannot transmit the power of the drive shaft 1 to the engine-side drive gear 3. However, when the brake 19 is maintained in an engaged state, the power of the drive shaft 1 which has been transmitted to the carrier C can be output to the ring gear R after the speed of the power is increased, so the engine-side drive gear 3 can be rotated at a speed higher than the speed of the drive shaft 1. In the above state, the engine clutch 15 should be maintained in a released state.

Further, a generator G is connected to the ring gear R of the planetary gear mechanism 17 so as to generate electricity using input power. Accordingly, the generator G can generate electricity using the power of the engine E. The electricity generated by the generator G is charged in a battery, and is supplied to the motor M.

In the present embodiment, the clutch unit 9 may include a dog clutch or a synchro-meshing device that can switch the operating state of the engine-side driven gear 7 between a fixed state and a released state relative to the output shaft 5.

Here, to connect the engine-side driven gear 7 to the output shaft 5 when a dog clutch is used as the clutch unit 9, it is required to bring the dog clutch into an engaged state after the rotating speed of the engine-side driven gear 7 has been controlled to approach the rotating speed of the output shaft 5 so as to reduce the rotating speed difference between the engine-side driven gear 7 and the output shaft 5 by controlling both the engine E and the generator G. On the other hand, when a synchro-meshing device is used as the clutch unit 9, the synchro-meshing device can more efficiently connect the engine-side driven gear 7 to the output shaft 5 and can more efficiently transmit power from the engine-side driven gear 7 to the output shaft 5 compared to the dog clutch even when the rotating speed difference between the engine-side driven gear 7 and the output shaft 5 is high.

Further, in an exemplary embodiment of the present invention, the diameter of the engine-side drive gear 3 is configured to be larger than the diameter of the engine-side driven gear 7, and the diameter of the motor-side drive gear 11 is configured to be smaller than the diameter of the motor-side driven gear 13. Accordingly, when a vehicle is being driven by power of the engine E, the engine power can be transmitted to drive wheels in an overdrive state, so a high speed driving mode of the vehicle can be performed mainly by the engine power. However, when the vehicle is being driven by power of the motor M, the motor power is output after increasing the motor torque by reducing the speed of the motor power, so a low speed driving mode of the vehicle can be performed mainly by power of the motor M. Thus, the hybrid gear train of the present invention can efficiently and complementarily utilize the engine torque characteristics and the motor torque characteristics, and can increase the mileage of the vehicle.

Figure 2:
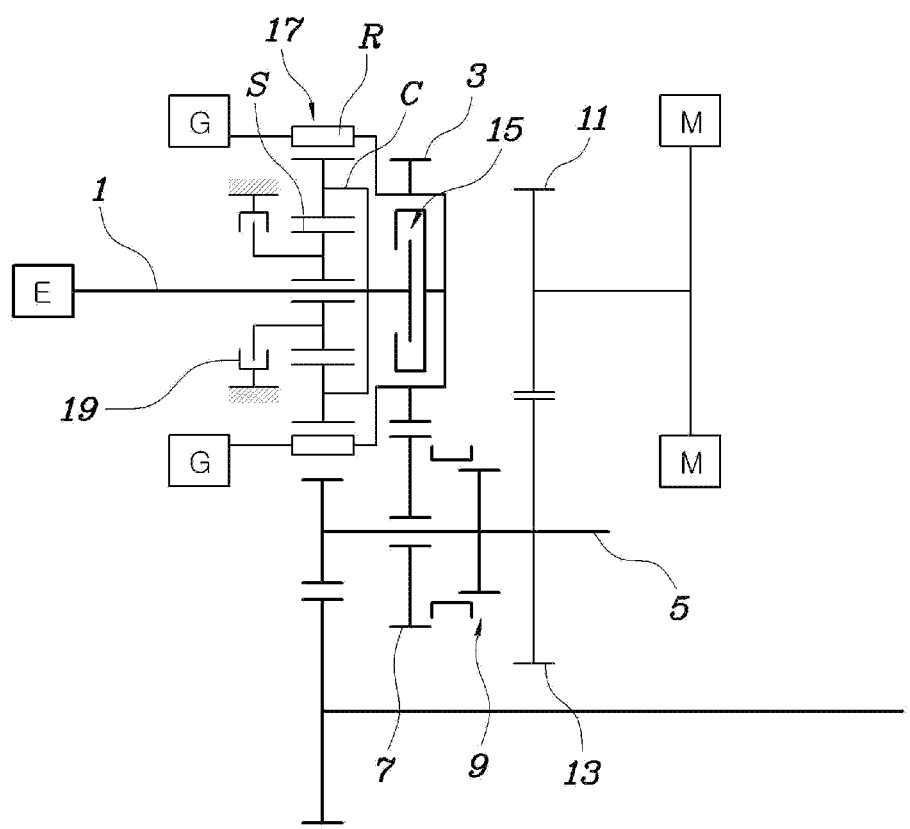
FIG. 2 is a view illustrating the hybrid power train according to the exemplary embodiment of FIG. 1 when the hybrid power train forms a first gear stage in an engine mode.
Figure 3:
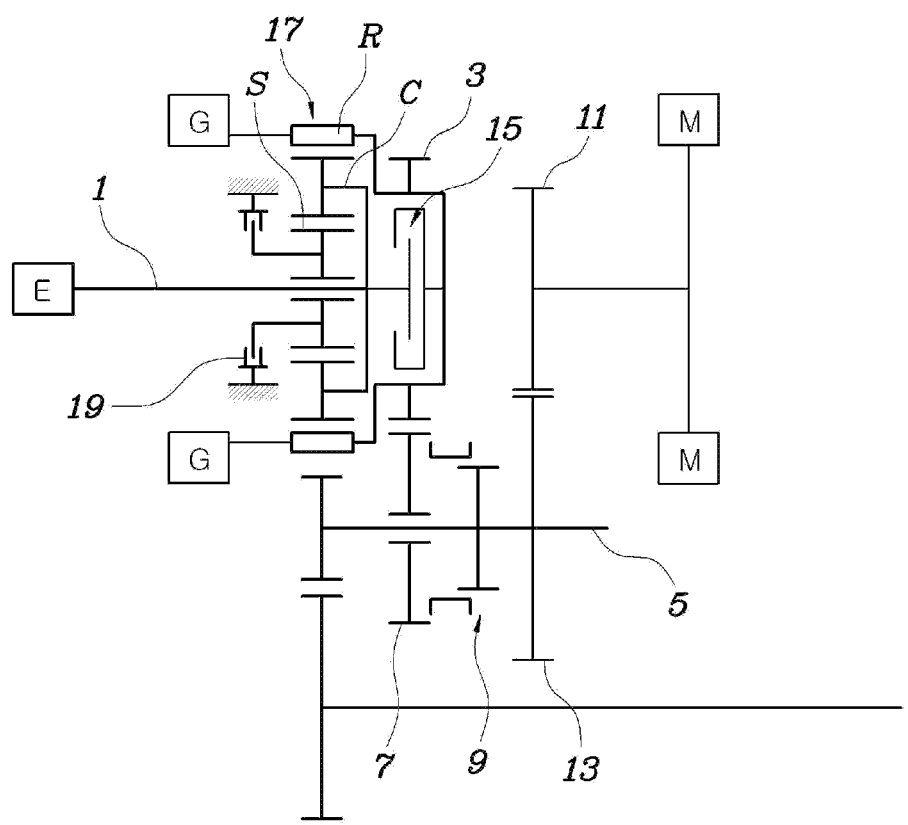
FIG. 3 is a view illustrating the hybrid power train according to the exemplary embodiment of FIG. 1 when the hybrid power train forms a second gear stage in the engine mode.

FIGS. 2 and 3 illustrate the hybrid power train according to the present embodiment when the hybrid power train forms different gear stages in an engine mode, in which FIG. 2 illustrates that the hybrid power train forms a first gear stage in the engine mode. In the first gear stage in the engine mode, the engine clutch 15 has been brought into an engaged state, the brake 19 has been brought into a released state, and the clutch unit 9 connects the engine-side driven gear 7 to the output shaft 5.

Thus, the engine power is transmitted to the engine-side drive gear 3 via the engine clutch 15, and the power that has been transmitted from the engine-side drive gear 3 to the engine-side driven gear 7 is transmitted to the output shaft 5 via the clutch unit 9 prior to being output from the output shaft 5 to a differential gear set, etc.

FIG. 3 illustrates that the hybrid power train forms a second gear stage in the engine mode. In the second gear stage in the engine mode, the engine clutch 15 has been brought into a released state, the brake 19 has been brought into an engaged state, and the clutch unit 9 connects the engine-side driven gear 7 to the output shaft 5, so the engine power can be transmitted to the engine-side drive gear 3 after the speed of the power has been reduced by the planetary gear mechanism 17. The power is then output from the engine-side drive gear 3 to the output shaft 5 via both the engine-side driven gear 7 and the clutch unit 9.

Figure 4:
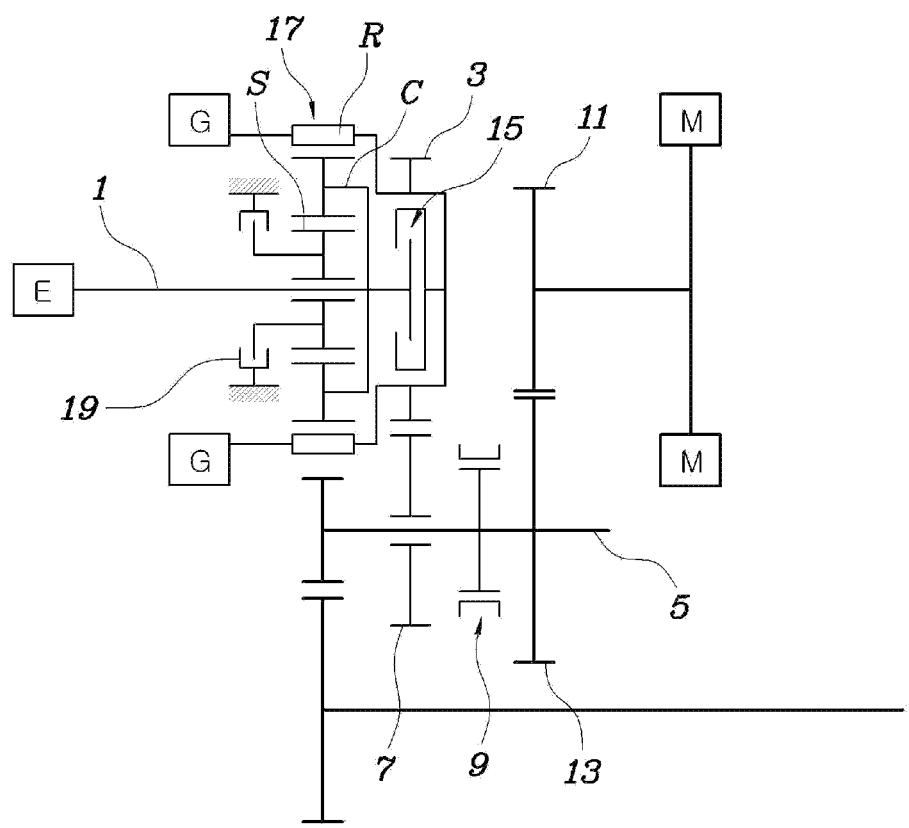
FIG. 4 is a view illustrating the hybrid power train according to the exemplary embodiment of FIG. 1 when the hybrid power train enters an EV mode.

FIG. 4 illustrates the hybrid power train according to the present embodiment when the hybrid power train enters an EV mode. In the EV mode, the engine may be maintained in a stopped state, both the engine clutch 15 and the brake 19 have been brought into respective released states, and, particularly, the clutch unit 9 has been brought into a released state in which the engine-side driven gear 7 is disconnected from the output shaft 5. In the above state, motor power can be directly output to the output shaft 5 via both the motor-side drive gear 11 and the motor-side driven gear 13.

Figure 5:
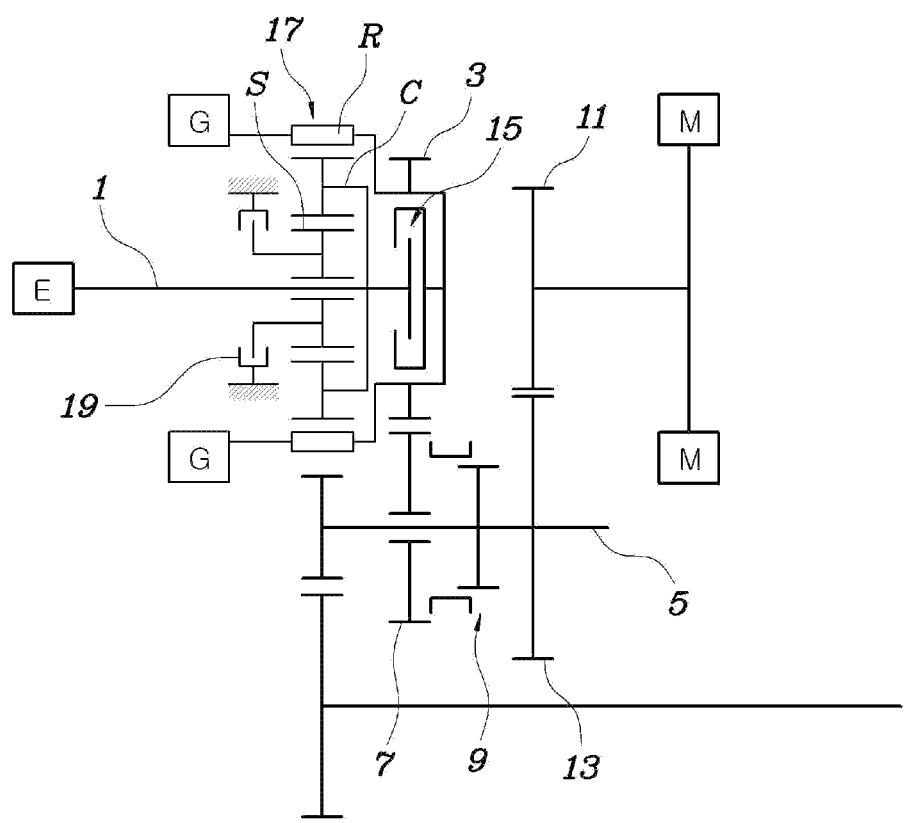
FIGS. 5 and 6 are views illustrating the hybrid power train according to the exemplary embodiment of FIG. 1 when the hybrid power train forms different parallel modes.
Figure 6:
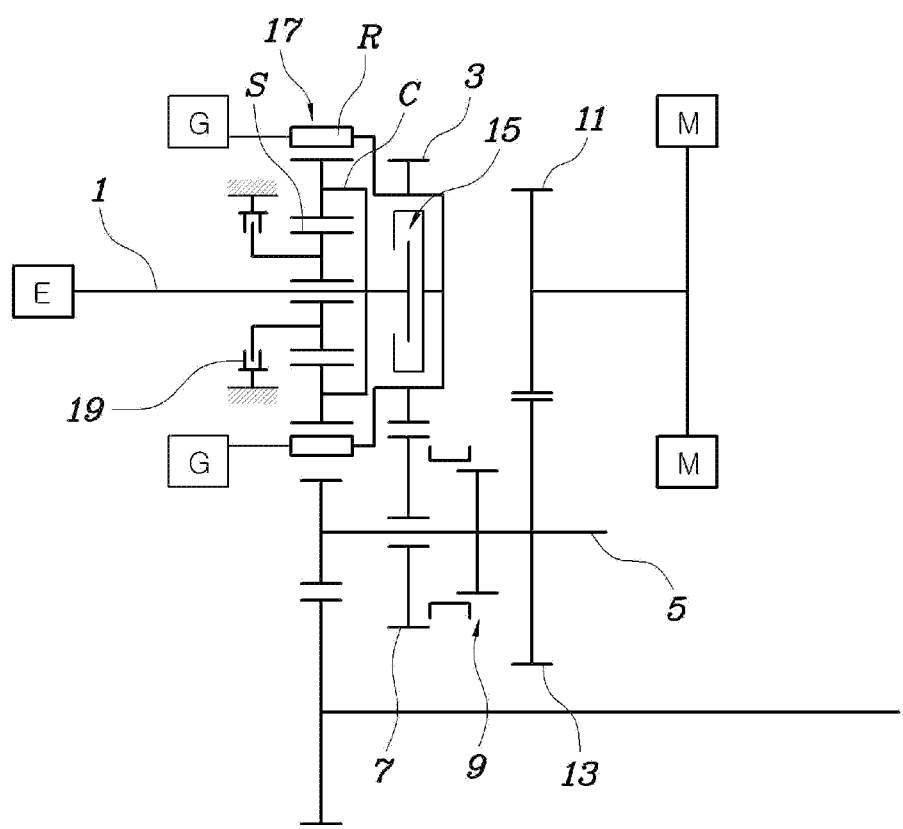

FIGS. 5 and 6 illustrate the hybrid power train according to the present embodiment when the hybrid power train forms different gear stages in a parallel mode. Here, FIG. 5 shows a gear stage in which the engine clutch 15 has been brought into an engaged state, the brake 19 has been brought into a released state, the clutch unit 9 connects the engine-side driven gear 7 to the output shaft 5, and the engine and the motor are operated at the same time, so engine power and motor power are joined together at the output shaft 5 and the joined power is output from the output shaft 5 to a differential gear set, etc.

FIG. 6 shows a gear stage in the parallel mode which has been realized by releasing the engine clutch 15 and by bringing the brake 19 into an engaged state from the gear stage of the FIG. 5. In the gear stage in the parallel mode shown in FIG. 6, engine power can be transmitted to the engine-side drive gear 3 and to the engine-side driven gear 7 after the speed of the engine power has been increased, so the engine power and the motor power can be output from the output shaft 5 after being joined together. Accordingly, in the gear stage of FIG. 6, rpm of the power output from the output shaft 5 may be higher than rpm in the gear stage of FIG. 5.

Figure 7:
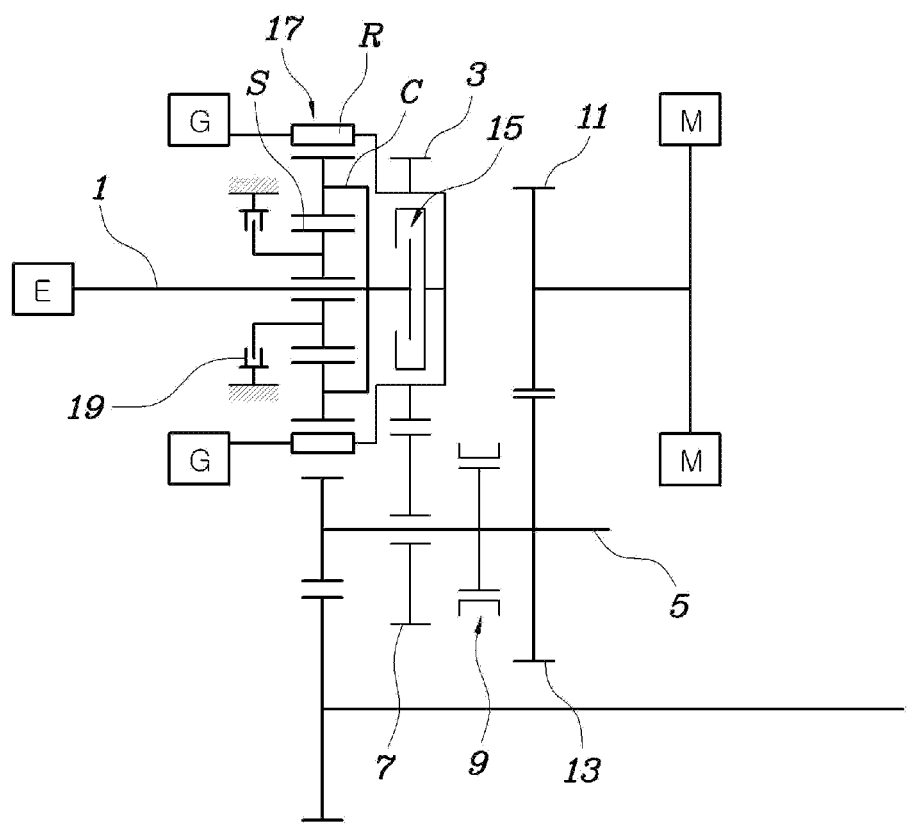
FIG. 7 is a view illustrating the hybrid power train according to the exemplary embodiment of FIG. 1 when the hybrid power train enters a series mode.

FIG. 7 illustrates the hybrid power train according to the present embodiment when the hybrid power train enters a series mode that is one of the hybrid modes. In the series mode, the engine clutch 15 has been brought into a released state, the brake 19 has been brought into an engaged state, and the clutch unit 9 connects the engine-side driven gear 7 to the output shaft 5, so engine power is not transmitted to the output shaft 5, but is transmitted to the ring gear R, thereby driving the generator G. Accordingly, the generator G generates electricity, and the electricity is charged in the battery or is supplied to the motor M. In the above state, the motor M is rotated by electricity, and outputs motor power. Here, the motor power is transmitted to the output shaft 5 via the motor-side drive gear 11 and the motor-side driven gear 13.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid power train for vehicles, comprising:
a drive shaft installed to be rotated by power of an engine;
an engine-side drive gear concentrically installed on the drive shaft so as to be concentrically rotated by power of the drive shaft;
a first power transmission control unit and a second power transmission control unit configured such that the first and second power transmission control units form different power transmission paths for transmitting the power from the drive shaft to the engine-side drive gear, and control respective power transmission states;
an output shaft arranged in parallel to the drive shaft;
an engine-side driven gear rotatably provided on the output shaft and meshed with the engine-side drive gear;
a clutch unit provided switching an operating state of the engine-side driven gear between a fixed state and a released state relative to the output shaft;
a motor-side drive gear rotated by power of a motor; and
a motor-side driven gear fixedly provided on the output shaft and meshed with the motor-side drive gear,
wherein the first power transmission control unit comprises an engine clutch installed between the drive shaft and the engine-side drive gear; and
wherein the second power transmission control unit comprises a planetary gear mechanism installed between the drive shaft and the engine-side drive gear at a location separated from the engine clutch.

2. The hybrid power train for the vehicles as set forth in claim 1, wherein the engine clutch is mounted inside the engine-side drive gear.

3. The hybrid power train for the vehicles as set forth in claim 1, wherein the planetary gear mechanism includes:
a carrier directly connected to the drive shaft;
a ring gear directly connected to the engine-side drive gear;
a sun gear rotatably installed on the drive shaft such that a rotation of the sun gear is controlled; and
a brake installed to be selectively engaged with the sun gear to control the rotation of the sun gear.

4. The hybrid power train for the vehicles as set forth in claim 3, wherein a generator is connected to the ring gear of the planetary gear mechanism so as to generate electricity using input power.

5. The hybrid power train for the vehicles as set forth in claim 1, wherein the clutch unit includes:
 a dog clutch configured to switch the operating state of the engine-side driven gear between the fixed state and the released state relative to the output shaft.

6. The hybrid power train for the vehicles as set forth in claim 1, wherein the clutch unit includes:
 a synchro-meshing device configured to switch the operating state of the engine-side driven gear between the fixed state and the released state relative to the output shaft.

7. The hybrid power train for the vehicles as set forth in claim 1,
 wherein the engine-side drive gear has a diameter larger than a diameter of the engine-side driven gear; and
 wherein the motor-side drive gear has a diameter smaller than a diameter of the motor-side driven gear.

* * * * *